May 20, 1952          W. M. TRIGG          2,597,138

VISCOSITY INDICATING AND CONTROLLING APPARATUS

Filed July 31, 1947          2 SHEETS—SHEET 1

WITNESSES:
Robert C. Baird

INVENTOR
Warren M. Trigg
BY
Frederick Shapoe
ATTORNEY

May 20, 1952 W. M. TRIGG 2,597,138
VISCOSITY INDICATING AND CONTROLLING APPARATUS
Filed July 31, 1947 2 SHEETS—SHEET 2
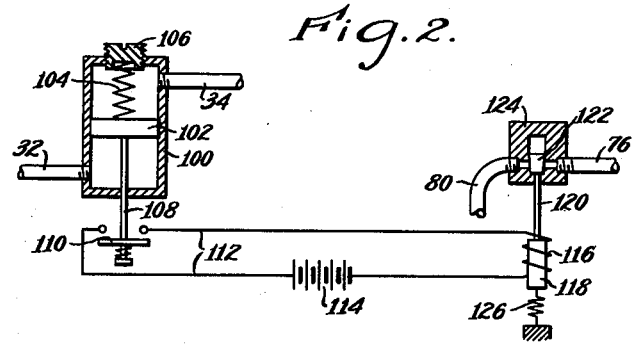
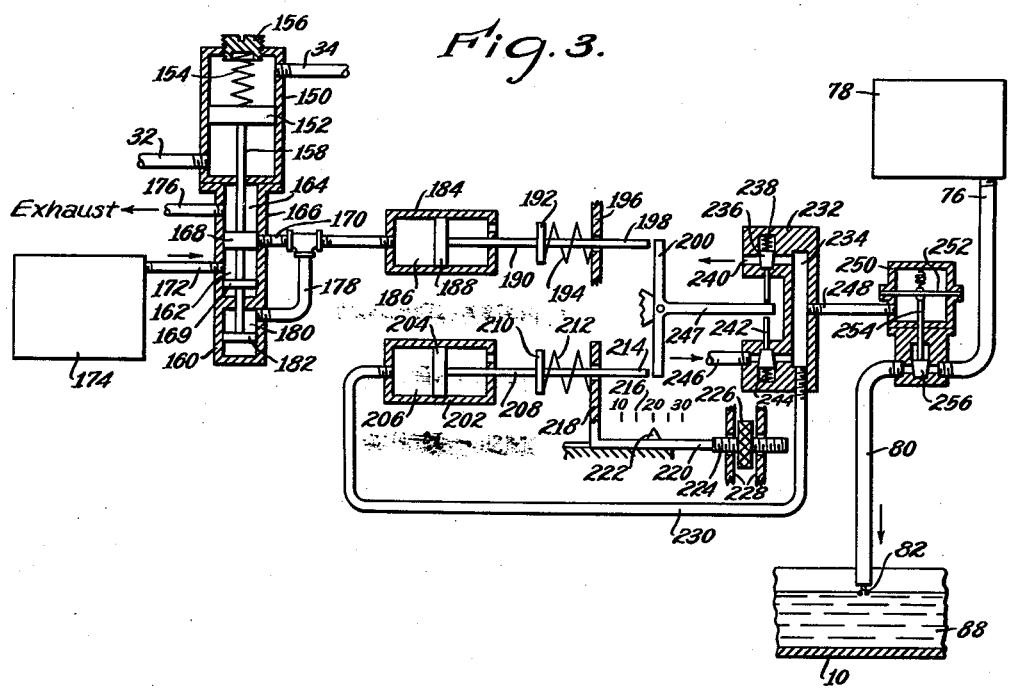
WITNESSES:
Robert C. Baird
Rw. C. Groome
INVENTOR
Warren M. Trigg.
BY
Frederick Shapoe
ATTORNEY Patented May 20, 1952

2,597,138

UNITED STATES PATENT OFFICE 2,597,138

VISCOSITY INDICATING AND CONTROLLING APPARATUS

Warren M. Trigg, Pittsburgh, Pa., assignor to Westinghouse Electric Corporation, East Pittsburgh, Pa., a corporation of Pennsylvania Application July 31, 1947, Serial No. 765,232

7 Claims. (Cl. 137—78)

This invention relates to the regulation or control of viscosity of fluids and more particularly to apparatus for automatically controlling as well as indicating the viscosity of a fluid.

In many industrial processes, there is involved some fluid material and in many cases the viscosity of the fluid is an important characteristic bearing on its suitability for such application. Viscosity has been defined as the resistance to flow in a liquid. Often it is necessary to control the viscosity of a fluid within some relatively narrow range in order to secure best results. For example, the viscosity of coating compositions determines the thickness of the coating which may be applied under a given set of conditions. Viscosity may also control the ease with which a given surface is covered. In wire enameling, for example, the thickness and the uniformity of coating is closely related to the viscosity of the enamel being applied. The thickness of an enameled coating on enameled wire must be maintained within certain narrow limits if the wire is to meet standard specifications. Many fluid compositions such as oils, paints, resin solutions, waxes, polishes, and the like must be prepared within a predetermined range of viscosity before use or sale to the trade. In all these and in many other cases, the viscosity must be known as well as be controlled within close limits.

While a variety of laboratory devices is available for the purpose of determining viscosity, tests performed therewith are often time consuming and not readily adaptable for control of viscosity since there is no provision for directly controlling the viscosity of the fluid being tested by any known laboratory devices. Attempts have been made in one or two known instances for automatically controlling the viscosity of a fluid by means of suitable equipment. However, experience shows that these devices are not sufficiently reliable or accurate to enable close control. Such known apparatus has been found to be extremely costly and the results do not justify such costs. Further, constant check-up with laboratory instruments is required to maintain them in operating condition. Therefore, the common practice is to use manual control based on laboratory instrument tests.

The object of this invention is to provide an automatic viscosity control device, responsive to minute changes in viscosity of the fluid being controlled.

A further object of this invention is to provide a device capable of controlling the viscosity of a fluid to a precise value by adding thereto a viscosity modifying component.

A still further object of the invention is to provide an apparatus for combining materials in such proportions as to attain a predetermined viscosity value.

Other objects of the invention will in part be obvious and will in part appear hereinafter.

For a fuller understanding of the nature and objects of this invention, reference should be had to the following detailed description and drawings, in which:

Fig. 2 is a fragmentary view partly in section of another modification of the invention, and Fig. 3 is a fragmentary view of a third embodiment of the invention, partly in section.

Figure 1:
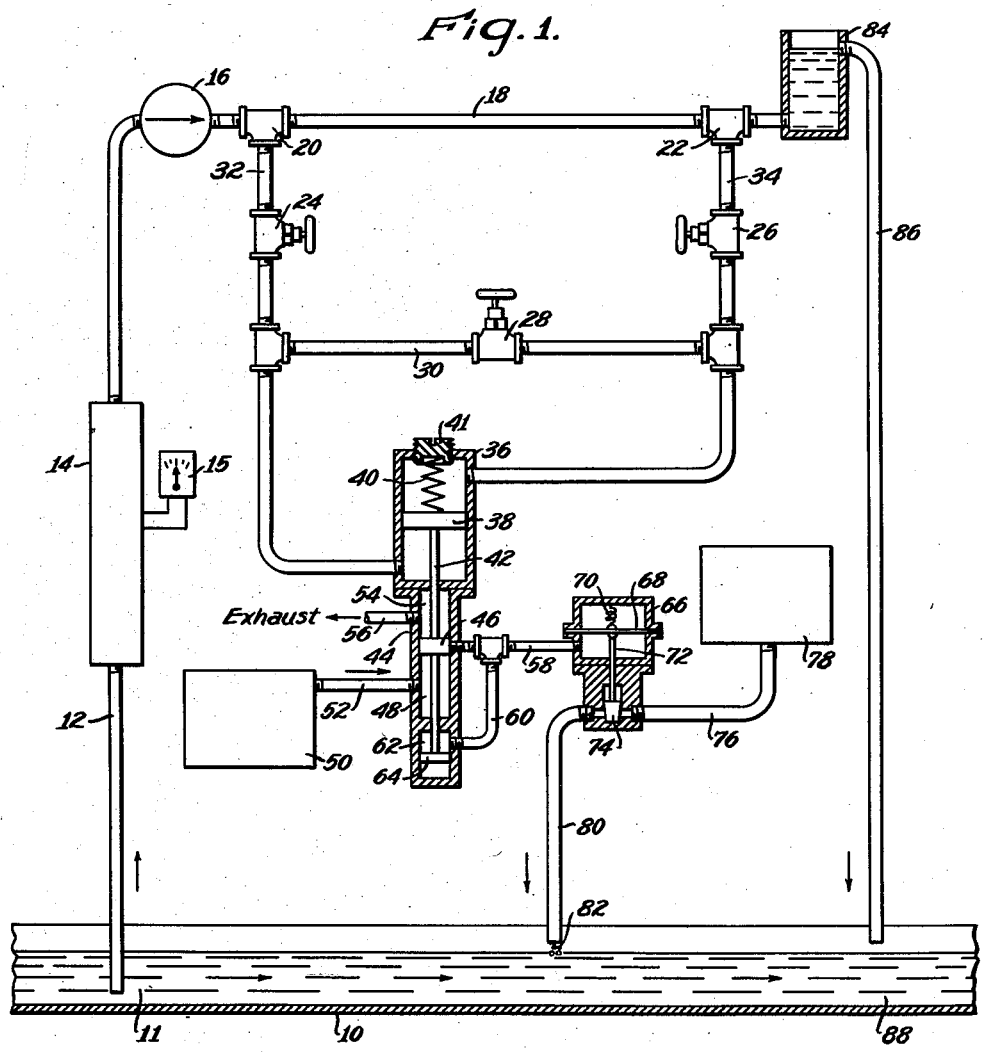
Figure 1 is a view in elevation, partly in section of one embodiment of the invention.

According to the present invention, a portion of a fluid whose viscosity is to be measured, and regulated or controlled by adding thereto a viscosity modifying component is pumped at constant volume and at constant temperature through a conduit of such dimensions that a significant drop of pressure is present between the ends of the conduit. The pressure drop $\Delta p$ in a conduit is given by $$\Delta p = \frac{K \mu L u}{d^2}$$

where $\mu$ is the absolute viscosity
$L$ is the length of the conduit
$u$ is the average velocity of the fluid
$d$ is the diameter of the conduit.

With a conduit of fixed length and diameter, and when the fluid is pumped at a constant volume so that the average velocity is constant, the pressure drop $\Delta p$ is directly proportional to the viscosity. This drop in pressure has been employed to operate a suitable mechanism to control the viscosity by introducing the viscosity modifying component. In practice, it has been found advantageous to magnify the pressure drop between the ends of the conduit by means of suitable relays, switches and power mechanisms to operate a valve or a pump, as well as to effect a record of the viscosity.

Referring to Fig. 1 of the drawings, there is illustrated an apparatus which is suitable for precisely controlling or maintaining the viscosity of a fluid, such as a wire enamel, by adding thereto solvent in such proportions as to thin the wire enamel to a predetermined viscosity. The device is particularly suitable for treating wire enamel being withdrawn from enameling towers or the like where a substantial portion of the solvent may have evaporated under the influence of heat. The wire enamel is recirculated to the wire enameling towers continually in order that thinner or solvent may be added thereto to maintain a precise degree of viscosity to enable deposition of a coating of enamel of the required thickness in wire.

In the channel 10 a portion of wire enamel 11 which is uniformly of higher viscosity than desired for enameling is drawn into the conduit 12 where it is heated in a heating device 14 to a predetermined temperature as set on a thermostat 15. Since viscosity is a direct function of temperature, it is quite critical that the temperature be maintained substantially constant, usually within 1° C. or less.

The temperature employed may be set at any suitable value. It has been found that a temperature value of 120° F. is excellent for wire enamel. Since it is well above room temperature it can be secured at all times and maintained accurately. Heavy oils may be heated higher, to say 160° F. or more, to reduce their absolute viscosity and tested without any change in the apparatus. Depending on the requirements, the latitude of permissible temperature variation may be less or more than this value. A constant volume pump 16, for example, a gear pump or a multiple piston pump, forces the enamel into a conduit 18 so proportioned that a significant pressure drop will be noted between the ends 20 and 22 thereof. For testing wire enamel, a pump of a capacity of 1½ gallons per minute forcing the enamel through a conduit consisting of 1/16" internal diameter pipe 18" in length was found to be quite satisfactory. The size and shape of the conduit is not too critical as will be apparent to those skilled in hydraulics. If the diameter of the pipe is excessive, the pressure drop will be so small that detection of small changes will be difficult and the degree of control that may be derived therefrom will be correspondingly less precise. A conduit of extremely fine diameter may be subject to considerable erratic variations in pressure drop and for this reason may not be too suitable. I have found that a ratio of length to diameter of a circular cross-section conduit in the range of 10 to 500 is suitable for use with most liquids of a viscosity of from 0.2 to 5,000 centipoises. Heavier liquids, such as certain heavy oils, asphalts and the like will require either more heat to effect a viscosity reduction or a proportionate change in the conduit dimensions, usually to a larger diameter, so as to give pressure drop values suitable for easy measurement.

The input end of the conduit 18 comprises a T 20 to which is connected the pipe 32 provided with a valve 24 and the output end of the conduit comprises another T 22 to which is fixed a second pipe 34 provided with a valve 26. An equalizing pipe 30 with the valve 28 connects the pipes 32 and 34. Valve 28 is closed except when pipe 30 is being employed for the purpose of setting zero viscosity or pressure drop conditions. The pipes 32 and 34 are connected to a pressure responsive device 36 within which is a movable piston 38, or other movable partition member which may be a diaphragm or the like. A spring 40 applied to the upper or low pressure side of the piston 38 may be adjusted by the setting screw 41 to any predetermined setting.

A piston rod 42 attached to piston 38 extends from the device 36 and is moved in response to the changes in pressure on the faces of the piston.

It will be apparent that when a fluid of relatively high viscosity is pumped through the conduit 18, the pressure in pipe 32 will be increased with respect to the pressure in pipe 34, whereby the piston 38 will move upward. Upon decrease in viscosity in a fluid passing through conduit 18, the pressure difference between 32 and 34 will diminish and the piston 38 will tend to move downwardly. By adjusting the screw 41, the position of the piston 38 and the rod 42 may be adjusted in accordance with the viscosity of a fluid being circulated through the conduit 18. The setting of screw 41 will control viscosity and it may be provided with a pointer and a fixed scale to indicate settings.

The end of the piston rod 42 remote from piston 38 moves within a control valve mechanism 44 where the piston rod carries a slide valve 46 capable of closely fitting the walls of the cylinder 48 and normally covering a port leading to a pipe 58. Compressed air at substantially constant pressure from a reservoir 50 or other supply source enters by an inlet 52 to the portion of the cylinder 48 below slide valve 46. Above the upper side of the slide valve 46 is a chamber 54 which exhausts to the atmosphere through the exhaust outlet 56. Upon movement of the slide valve 46 upwardly in response to an increase in pressure drop in the conduit 18, compressed air in the cylinder 48 will be admitted to the pipe 58 by the port exposed by such movement of the slide valve. Increased air pressure in the pipe 58 is conveyed by a feedback line 60 to a chamber 62 in control valve mechanism 44 where it operates on a piston 64 fastened to the end of the connecting rod 42 thereby tending to return the slide valve 46 to the position where it closes the port leading to pipe 58. Correspondingly, when the relative pressure drop in conduit 18 decreases, the piston 38 moves downward whereby the piston valve 46 permits air in the pipe 58 to enter the chamber 54 and thus exhaust to the atmosphere through outlet 56, and air pressure in chamber 62 is simultaneously exhausted through the feedback line 60 sufficiently to permit the piston valve 46 to move upwardly and close the port leading to pipe 58. Therefore, there is maintained a pressure in pipe 58 proportional to the viscosity of a fluid passing through the conduit 18.

Air in pipe 58 is delivered to a regulator valve 66 to act upwardly against a diaphragm 68 therein. Acting upon the upper side of the diaphragm 68 is a spring 70. The diaphragm 68 has a valve stem 72 attached thereto for movement in response to movement of the diaphragm in accordance with the air pressure in pipe 58. The valve stem 72 controls the position of a valve 74 which opens and shuts off the flow of thinner or solvent in the pipe 76 from a supply tank 78. The thinner in pipe 76 is under a suitable pressure so that it will flow readily when the valve 74 is opened. The thinner passes from pipe 80 as a stream 82 into the wire enamel where it mixes in by convection and distribution effects or by a suitable mixing means (not shown) to produce enamel 88 of predetermined viscosity.

The portion of wire enamel passing from conduit 18 past the outlet T 22 is delivered to a well 84 at a constant pressure head. The enamel drains from the well 84 through the overflow pipe 86. The well 84 enables samples of the undiluted enamel 11 to be taken.

The apparatus of Fig. 1 comprises means responsive to changes in viscosity, namely the pressure drop responsive device 36 cooperating with a compressed air control valve mechanism 44 which, in effect, will magnify the pressure drop in the former to such proportions as to operate the valve for adding solvent. The ratio of such magnification, everything else being equal, is proportional to the areas of piston 38 and piston 64. A ratio of from 5:1 to 100:1 is ordinarily sufficient.

In some cases the pressure drop in conduit 18 may be sufficient to operate a valve or other suitable mechanism of simpler construction and operation than in Fig. 1. Referring to Fig. 2 of the drawings, there is illustrated a control mechanism of this kind. The pressure responsive member 100 has connected thereto the high pressure and low pressure pipes 32 and 34 operating as shown in Fig. 1 for effecting relative movement of a piston 102 in coordination with a spring 104 which is applied with a predetermined pressure through the set screw 106. A piston rod 108 moved by piston 102, is connected to the contact arm of a switch 110. The switch 110 is adapted to open and close the circuit 112 energized from a source of electrical energy 114 which may be a battery, a generator or the like. The circuit 112 comprises a coil 116 embodying a solenoid plunger 118 which reciprocates a valve stem 120 to open and close the valve 122 disposed in the valve body 124 thereby to control flow of thinner from the pipe 76 into the pipe 80. A spring 126 pulls the solenoid 118 and valve 122 downwardly when the coil 116 is not energized thereby to close the valve. The electrical switch 110 may be of such construction as meets the requirements of the application in which the viscosity controlling device is embodied. Thus the switch 110 may be a switch which may be opened or closed by relative movements of a few hundredths of an inch for securing close control of viscosity or it may require considerable changes in movement of rod 108 before valve 122 is energized.

It is often desirable to have a mechanism in which a predetermined value of fluid viscosity may be selected and set and the mechanism will automatically follow such set value and operate to produce a fluid of the selected viscosity by adding a viscosity modifying component to the fluid as required. An apparatus capable of so functioning is illustrated in Fig. 3 of the drawings. There the pipes 32 and 34 from the high and low pressure ends of the conduit 18, as in Fig. 1, pass fluid into a pressure responsive member 150 containing a movable piston 152 upon which the adjustable spring 154 acts subject to the position of a set screw 156. A connecting rod 158 attached to the piston 152 moves in response to the movement of piston 152 in response to the relative pressure difference on the upper and lower face thereof which, in turn, is dependent on the relative pressures in lines 32 and 34. The connecting rod 158 extends into a control valve mechanism 160 wherein a sliding valve 168 is reciprocated in a cylinder 166 to control the air pressure in line 170. Compressed air via a conduit 172 from a compressed air tank or other source 174 enters a chamber 164 defined between sliding valve 168 and a sealing piston 169. Since the air pressure in chamber 162 operates on equal areas on valve 168 and sealing piston 169, changes in compressed air pressure in tank 174 will not affect the operation of the mechanism 160. When the sliding valve 168 is moved upwardly from the position illustrated in the drawings, air enters the line 170. Compressed air is vented from the line 170 to chamber 164 and to the atmosphere by an exhaust 176 when the sliding valve 168 is lowered from the position shown in the drawings. The air pressure in line 170 passes through a feedback pipe 178 to the chamber 180 where it acts on the upper surface of piston 182 fixed to the end of rod 158 whereby to center the sliding valve 168. Therefore, the air pressure in line 170 is proportional to the viscosity of the fluid applied to the apparatus. The compressed air in pipe 170 passes to a cylinder 186 of a first air motor 184 where it acts on and may move a piston 188 and a rod 190 fixed to the piston. The rod 190 is provided with a fixed shoulder 192 against which one end of a spring 194 exerts a pressure. A fixed abutment 196 restrains the other end of the spring 194. The end 198 of the rod 190 is adapted to apply pressure against one arm of a positional member 200 in the form of a T-shaped lever. The other arm of the T-shaped lever member 200 is acted upon by a second air motor 202 comprising a piston 204 operating in a cylinder 206 and carrying a piston rod 208. The rod 208 is provided with a fixed shoulder 210 against which a spring 212 exerts pressure. The end 214 of the rod applies pressure tending to move the positional member 200 in a direction contrary to that caused by movement of the end 198.

The spring 212 abuts against an adjustable bracket 218 affixed to a slidable arm 220 carrying a pointer 222 which may be read or positioned against a scale 216. The slidable rod 220 is provided with a threaded portion 224 which is engaged by a threaded adjusting nut 226 held from lateral movement by the fixed stops 228. By rotating the nut 226, the slide member 220 and the bracket 218 may be moved horizontally to any desired point. The pointer 222 indicates the setting of the nut 226. The scale 216 may be calibrated to indicate viscosity values directly.

Air to operate the second air motor 202 enters through a pipe 230 connected with a valve mechanism 232 in such a way as to receive air from an air chamber 234 therein. The valve mechanism 232 carries an exhaust valve 236 maintained in closed position by the spring 238. Counterclockwise movement of positional member 200 causes an arm 247 thereon to move upwardly thus opening exhaust valve 236 and permitting air to exhaust from chamber 234 to the atmosphere through an exhaust vent 240. Upon clockwise movement of positional member 200, the arm 247 moves downwardly and opens a valve 242, normally maintained in closed position by a spring 244, whereby compressed air from a conduit 246 is admitted to the chamber 234.

The chamber 234 communicates through the pipe 248 with an air pressure operated valve 250 consisting of a diaphragm 252 directly connected to a valve stem 254 to move a valve 256 to an open or to a closed position. The valve 256 controls the flow of thinner from the conduit 76, fed from a tank of thinner 78, to an outlet 80 to the body of fluid in trough 10. The fluid 88 with such added thinner thereby is maintained at a selected viscosity.

The operation of the air motors 184 and 202 in combination with the valve mechanism 232 is as follows. Assuming an initial neutral position for all the parts as shown in Fig. 3, upon an increase of viscosity in the fluid passing through conduit 18, the piston 152 is moved upwardly due to a relative increase in pressure in pipe 32 with respect to the pressure in pipe 34. Sliding valve 168 is moved upwardly by piston 152 and compressed air is admitted to line 170 from chamber 162 until enough pressure is built up to an extent sufficient to act on piston 182 to cause reverse motion of the rod 158, thereby causing downward movement of sliding valve 168 to close the end of the line 170. This increase in air pressure in line 170 operates on piston 188 in the first air motor 184 causing it to move to the right thereby moving the positional member 200 clockwise so that the valve 242 is opened and more air with an increase in pressure is delivered to chamber 234. Due to the pressure increase in chamber 234 air passes through the pipe 230 to the cylinder 206 in the second air motor 202 thereby applying more force on the piston 204 to the right and upon the air pressure in the chamber 234 building up sufficient pressure will be applied by end 214 to the positional member 200 to move the piston 188 to the left until the positional member 200 is returned to neutral position. The increase in air pressure in chamber 234 is transmitted by pipe 248 to the diaphragm 252 which operates the valve 256 to permit the flow of thinner. Such flow of thinner will be maintained as long as the viscosity is at the predetermined high level.

If the viscosity of the enamel passing through conduit 18 drops, a proportional decrease in pressure between pipes 32 and 34 will result in the piston 152 being lowered and sliding valve 168 connecting line 170 to exhaust chamber 164 whereby the pressure in line 170 and chamber 186 is reduced proportionately until such reduced pressure reacting on piston 182 allows sliding valve 168 to cover the port to line 170. The corresponding decrease in pressure in chamber 186 of the first air motor 184 causes a decrease in the pressure applied to the positional member 200 by the end 198 of the rod 190 and, therefore, the arm 247 will be moved counterclockwise by end 214 of the second air motor, thereby pushing the valve 236 to open position to exhaust air from the chamber 234. The drop in pressure in chamber 234 is communicated to the chamber 206 of the second air motor whereby the pressure on piston 204 drops until the positional member 200 returns to a neutral position due to the balance of pressures applied ends 198 and 214 of the first and second air motors respectively.

The operation of the viscosity indicating and controlling device 220, 222, 216, etc., is as follows. Assuming a fluid of a given viscosity is present in conduit 18 and all of the mechanism is in the substantially neutral position, when it is desired to secure a fluid of lower viscosity, the nut 226 is rotated so that the bracket 218 is moved to the left to increase the pressure on the spring 212. The increase in pressure in spring 212 is communicated to the piston rod 208 thereby unbalancing the relative pressures applied by ends 198 and 214 to the positional member 200 whereby the positional member 200 is moved clockwise. This results in admitting air under pressure to chamber 234 which operates the regulator valve 250 and admits a corresponding increase of thinner to the enamel. The second air motor 202 is affected by the increase in air pressure in chamber 234 so as to move the piston rod 208 due to its greater force and thereby the positional member 200 is again returned to a neutral position.

It will be apparent that a conventional pressure recorder may be connected into the pipe 58 (Fig. 1) or line 170 (Fig. 3) to record the pressures therein which is proportional to the viscosity of the fluid in conduit 18, thereby a definite record of the viscosity of the fluid may be made in addition to securing a control of the viscosity by the apparatus.

While the specific embodiments of the invention in the drawings were all directed to the control of viscosity of an enamel by adding thinner thereto, it would be equally feasible to add a heavier or thickening constituent, such as resin, to the enamel if it were desired to increase the viscosity of the enamel. This would only entail connecting the pipe 58 to the chamber above the diaphragm 68 in the valve 66 in Fig. 1, for example, and employing valve 74 to control the flow of the thickening constituent. Additionally, it is feasible to control both the flow of thinner and thick resin as required by providing a plurality of regulator valves 66 (Fig. 1), one to control the flow of thinner as shown and a second one having a branch of the pipe 58 leading to the chamber above the diaphragm 68 in a second regulator valve to control the flow of thick resin. In Fig. 3, a second regulator valve 259 connected to pipe 248 would control the flow of the heavier resin. This latter expedient is particularly suitable for the compounding of paints and other compositions comprising an admixture of two or more components of different viscosity to secure a composition having a single desired viscosity.

The mechanism of the present invention may be employed in combination with mixers, blenders, mills, stirrers, and similar apparatus in which ingredients are being combined to control the addition of one of the components to the mixer to reach a predetermined viscosity. Thus pastes, adhesives, oils and various fluid preparations may be manufactured to a viscosity best suitable for use.

In one case, apparatus corresponding in operation to that of Fig. 3 of the drawings has been employed in combination with wire enameling systems. In such systems, it has maintained the viscosity to so precise a degree that only tests with precision laboratory equipment or apparatus could detect any changes in viscosity from the set value.

The valves 74, 122 and 256 may be of the full open or full closed type, or may be proportional opening valves capable of regulating the solvent flow in any predetermined amount between full open and full closed position. Both types have been made use of and it has been found that they are equally satisfactory.

While the apparatus of Figs. 1, 2 and 3 functions to admit solvent by opening a valve, pumps may be substituted. Thus in Fig. 2, for example, the circuit 112 may be employed to operate an electric motor to drive a pump for adding solvent to the enamel. In Fig. 1, the stem 72 and in Fig. 3, the stem 254 would operate a switch to a motor and pump unit. The use of a motor driven pump would be desirable if the solvent were in storage tanks below ground.

Since certain changes may be made in the above invention, and different embodiments of the invention may be made without departing from the scope thereof, it is intended that all matter contained in the above disclosure or taken in connection with the accompanying drawings shall be interpreted as illustrative and not in a limiting sense.

I claim as my invention:

1. An apparatus for controlling the viscosity of a fluid by adding thereto a component capable of modifying the viscosity thereof, comprising, in combination, a substantially constant volume pump for pumping a portion of the fluid at a given temperature, a conduit connected to the pump output to receive the portion of fluid at constant velocity therethrough, the conduit being so proportioned that a significant drop in pressure in the fluid is present between the ends of the conduit, the end of the conduit opposite the pump being connected to means for maintaining a pressure against the outgoing fluid, pressure operable means connected to both ends of the conduit responsive to predetermined changes in pressure, said pressure operable means being connected to a valve means to add the modifying component to the fluid, said pressure operable means including fluid containing pipes transmitting pressure from the outlet and inlet ends of the conduit to a single enclosed chamber, a movable member disposed within the enclosed chamber to divide the chamber into two compartments, and a spring in one compartment applying a force to one face of the movable member, the pipe from the outlet end of the conduit connected to and admitting fluid under pressure to one of the compartments whereby the force of the spring and the outlet pressure unite in acting on the said one face movable member and the pipe from the inlet end of the conduit connected to and admitting fluid under pressure to the other compartment to apply a pressure on the movable member opposing the force of the spring.

2. An apparatus for controlling the viscosity of a fluid by adding thereto a component capable of modifying the viscosity thereof, comprising, in combination, a substantially constant volume pump for pumping a portion of the fluid, means for maintaining the fluid at a predetermined temperature, a conduit connected to the pump output through which said portion of fluid may pass, the conduit being so proportioned that a significant drop in pressure in the fluid is present between the ends of the conduit, the end of the conduit opposite the pump being connected to means for maintaining a pressure against the outgoing fluid, pressure operable means connected to both ends of the conduit responsive to predetermined changes in pressure said pressure operable means being connected to a valve means to add the modifying component to the fluid, said pressure operable means including fluid containing pipes transmitting pressure from the outlet and inlet ends of the conduit to a single enclosed chamber, a movable member disposed within the enclosed chamber to divide the chamber into two compartments, and a spring in one compartment applying a force to one face of the movable member, the pipe from the outlet end of the conduit connected to and admitting fluid under pressure to one of the compartments whereby the force of the spring and the outlet pressure unite in acting on the said one face movable member and the pipe from the inlet end of the conduit connected to and admitting fluid under pressure to the other compartment to apply a pressure on the movable member opposing the force of the spring.

3. An apparatus for controlling the viscosity of a fluid by adding thereto a component capable of modifying the viscosity thereof, comprising, in combination, a substantially constant volume pump for pumping a portion of the fluid at a given temperature, a conduit connected to the pump output through which said portion of fluid may pass, the conduit being so proportioned that a significant drop in pressure in the fluid is present between the ends of the conduit, the end of the conduit opposite the pump being connected to means for maintaining a pressure against the outgoing fluid, pressure operable means connected to both ends of the conduit responsive to predetermined changes in pressure, the pressure operable means including fluid containing pipes transmitting pressure from the respective ends of the conduit, a movable member connected to the fluid containing pipes and moving in response to changes of pressure, and power means associated with and energized upon a predetermined movement of the movable member to operate a valve to admit the viscosity modifying component to the fluid.

4. An apparatus for controlling the viscosity of a fluid by adding thereto a component capable of modifying the viscosity thereof, comprising, in combination, a substantially constant volume pump for pumping a portion of the fluid at a given temperature, a conduit connected to the pump output through which said portion of fluid may pass, the conduit being so proportioned that a significant drop in pressure in the fluid is present between the ends of the conduit, pressure operable means connected to both ends of the conduit responsive to predetermined changes in pressure, the pressure operable means including a movable partition, a first valve operated by the movable partition, the first valve controlling the flow of compressed fluid to operate a fluid pressure regulated valve controlling the flow of the modifying component to the fluid, and feedback means operated by the flow of compressed fluid to the pressure regulated valve to position the first valve to terminate flow of compressed fluid upon a predetermined fluid pressure being attained for operation of the pressure regulated valve.

5. In an apparatus responsive to changes in viscosity of a liquid from a predetermined value, in combination, a substantially constant volume pump for pumping a portion of the fluid at a given temperature, a conduit connected to the pump output to receive the portion of fluid at substantially constant velocity therethrough, the conduit being so proportioned that a significant drop in pressure in the fluid is present between the ends of the conduit, means attached to the output end of the conduit for maintaining a back pressure against the outgoing fluid, fluid containing pipes connected to each end of the conduit, the fluid containing pipes transmitting pressure from the respective ends of the conduit to a common member comprising a single movable chamber and a member in the chamber responsive to the difference in the pressure transmitted through the respective fluid containing pipes, one of the pipes connected to the chamber to apply pressure to one face of the movable member and the other pipe connected to the chamber to apply pressure to the other face, whereby the movement of the member is in response to the higher pressure, and a single compression spring of regulable force applied to the face of the movable member affected by the pressure from the outlet end of the conduit whereby the spring pressure is added to the outlet pressure on that face to oppose the inlet pressure applied on the other face.

6. The apparatus of claim 1 wherein said pressure operable means is provided with a means to operate an electrical switch, and a source of electrical energy and an electrically operated valve controlling flow of the modifying component being associated with the switch whereby the addition of modifying component to the fluid may be effected to control the viscosity of the fluid.

7. The apparatus of claim 1 wherein the connection between the pressure operable means comprises a source of power energized in accordance with relative movement of the movable member to apply pressure to a positionable member controlling a valve for admitting the modifying component to the fluid, and a second pressure applying means associated to apply an opposing pressure to the positionable member, the second pressure applying means being adjustable normally to enable a selected viscosity for the fluid to be attained, the operation of the positionable member being responsive to the net pressure between the second pressure applying means and the power energized pressure means to control the valve for adding the modifying component.

WARREN M. TRIGG.

REFERENCES CITED

The following references are of record in the file of this patent:

UNITED STATES PATENTS

| Number | Name | Date |
|---|---|---|
| 1,388,613 | Simsohn | Aug. 23, 1921 |
| 1,810,992 | Von Dallwitz-Wegner | June 23, 1931 |
| 1,909,469 | Hubbard | May 16, 1933 |
| 1,925,833 | French | Sept. 5, 1933 |
| 2,023,568 | Albarsheim | Dec. 10, 1935 |
| 2,171,312 | Meyers | Aug. 29, 1939 |
| 2,272,970 | Frymoyer | Feb. 10, 1942 |
| 2,435,416 | Thompson et al. | Feb. 3, 1948 |
| 2,459,483 | Zimmer et al. | Jan. 18, 1949 |